Nov. 24, 1959   W. HÖFLER   2,913,831
APPARATUS FOR THE MEASUREMENT OF GEARS AND THE LIKE
Filed Aug. 19, 1958   3 Sheets-Sheet 3
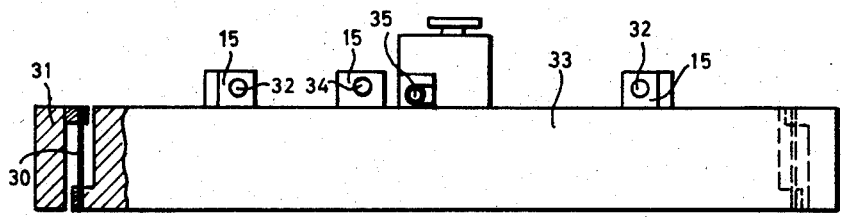
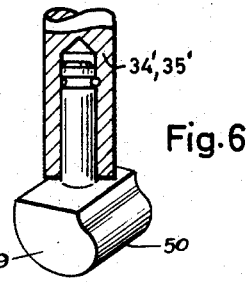
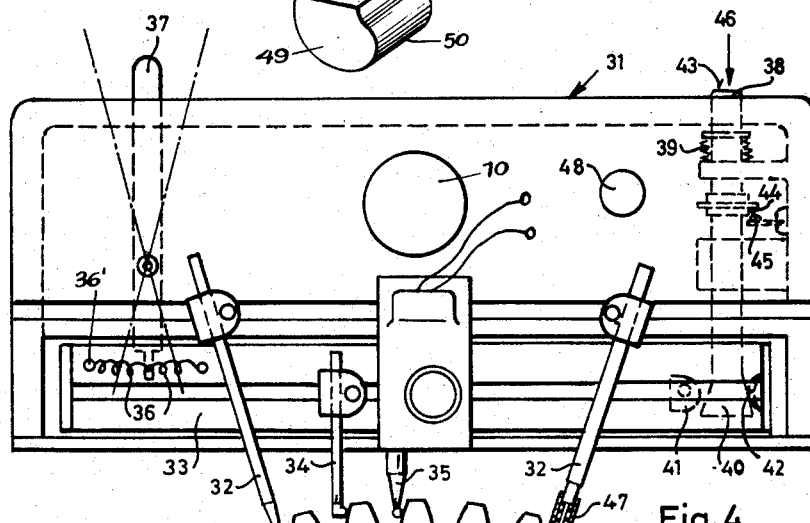
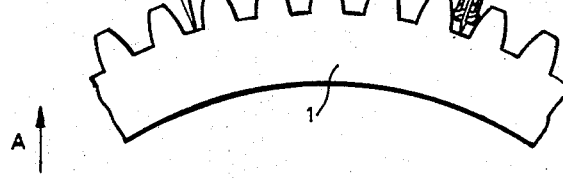

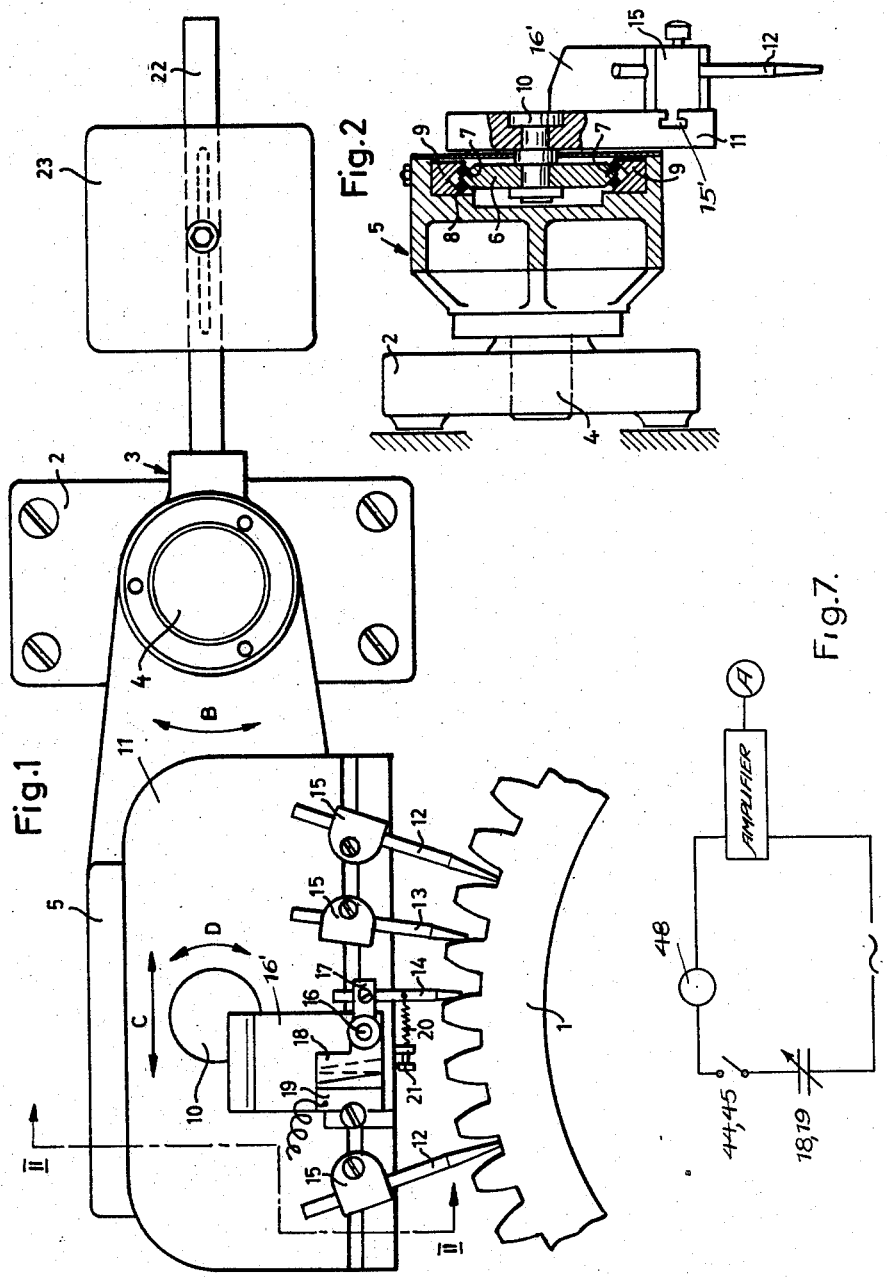

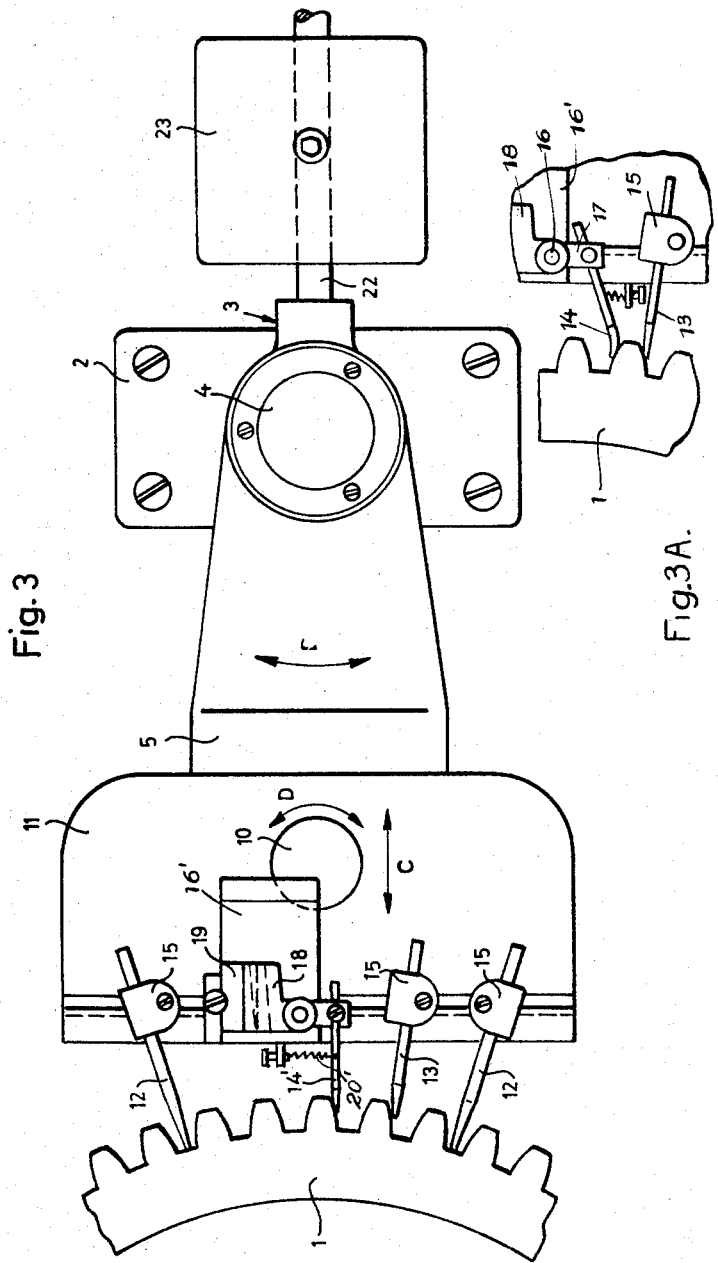

United States Patent Office 2,913,831
Patented Nov. 24, 1959

2,913,831

APPARATUS FOR THE MEASUREMENT OF GEARS AND THE LIKE

Willy Höfler, Karlsruhe, Baden, Germany

Application August 19, 1958, Serial No. 756,041

Claims priority, application Germany August 22, 1957

11 Claims. (Cl. 33—179.5)

The present invention relates to an apparatus for the measurement of gears and the like.

The application represents an improvement on the structure shown in my application Serial No. 607,891, filed September 4, 1956. In that application there is shown an arrangement for the measurement of recurring distances, especially the measurement of tooth spacing, tooth thickness or tooth gap width of toothed parts by means of two feelers, which are arranged on a universally movable carrier which moves with the test piece and remains exactly in the same relative position to it during measurement.

However, the device shown in that application is practicable only with a horizontal arrangement of the base plate, which leads to the requirement that the plane of travel of the test piece must also be horizontal. If the test piece is a gear, its axis must be vertical, that is, must lie in the direction of gravity. But there are cases where the gear to be tested must turn on a horizontal axis. That is, for instance, true of generators with herringbone gears or large gearing on horizontal shafts.

Likewise, also, the feelers for the measurement of tooth flanks in the case of large gears with inclined or herringbone teeth should not engage merely points on the tooth flanks, but a linear contact is necessary. Therefore the measuring device must be adjustable to the corresponding inclination of the teeth. The measuring arrangement should moreover be universally adjustable not only for movement in vertical planes but as well for measurement in horizontal planes.

The primary object of the present invention is to provide an apparatus for measuring gears and the like which overcomes the disadvantages of the prior art devices.

Another object of the invention is to provide an arrangement which, while operating in the same general manner as that described in my prior application, can be used for measurement of gears turning about horizontal or inclined axes, as well as vertical axes, and which is independent of the force of gravity.

A further object of the invention is to provide such an arrangement which can be used for measurement of a gear located in a vertical or inclined plane either from the top or from the side.

An additional object of the invention is to provide an arrangement in which it is possible to make linear contact with the flanks of the gear teeth, even though such teeth may be inclined.

Still a further object of the invention is to provide an arrangement which has provision for centering the spacing members with respect to the gear teeth so as to ensure accurate positioning of the feelers with respect to the teeth.

Still another object of the invention is to provide an arrangement which follows the movement of the test piece readily and without requiring great sensitivity in following the movement of the plate.

Further objects and advantages of the invention will appear more fully from the following description, especially when taken in conjunction with the accompanying drawings which form a part thereof.

In the drawings:

Fig. 1 shows in plan view a measuring arrangement according to the invention;

Fig. 2 is a cross-section on the line II—II of Fig. 1;

Fig. 3 shows the arrangement of Fig. 1 when used in a different position;

Fig. 3A shows a modified form of a portion of the device of Fig. 3;

Fig. 4 shows in plan view the carrier of a modified form of the invention;

Fig. 5 is a side view of Fig. 4;

Fig. 6 shows in perspective, partly in section, a detail of the end of the feelers of Fig. 4; and Fig. 7 is a wiring diagram showing the circuit used in connection with the arrangement of Fig. 4.

In the form of the invention shown in Figs. 1 and 2, the mechanism is utilized for measuring from above a gear 1 which is mounted to turn about a horizontal axis. A stationary plate 2 carries a horizontal pivot 4 for a two-armed lever 3. Arm 5 of this lever, which may be made of light metal and of ribbed construction, carries guides 9 having V-shaped grooves extending in the direction of the length of the lever arm which through rollers 8 engage the edges 7 of a slidable carriage member 6. The spacing between the guides 9 is such that the carriage 6 is movable without play in the direction of its longitudinal axis. Carried by the slide 6 is a pin 10, on which is pivoted a carrier 11. The spacing members 12 are adjustably mounted on blocks 15 having round heads 15' slidable in an undercut groove in the carrier 11. Also slidable in this groove is a block 15 for carrying the adjustably positioned stationary feeler 13. The spacing members and feeler can be adjusted longitudinally of the groove in their angularity and in their projection from the blocks.

The movable feeler 14 is adjustably mounted in a lever 17 pivoted at 16 on a block 16' carried by the carrier 11. The other end of lever 17 has a condenser plate 18 which cooperates with a fixed condenser plate 19 carried by the block 16', these two condenser plates being connected in circuit with a measuring instrument and a source of current and causing changes in the measuring instrument because of changes in the capacity when the movable plate is shifted with respect to the fixed plate. A coil spring 20 adjustable by a nut 21 mounted on a projection from the carrier 11 is connected to feeler 14 for holding that feeler resiliently against the flank of the tooth. Any other suitable system for measuring the movement or position of feeler 14 with respect to stationary feeler 13 may be used instead of the condenser plates.

The other arm 22 of lever 3 carries a counterweight 23 adjustable in position of carrying at least substantially the weight of the lever arm 5 and the carrier 11.

The measurement of the tooth wheel with such an arrangement is accomplished as follows:

First, the plate 2 is secured in a vertical position at a suitable distance from the wheel to be measured and counterweight 23 is properly spaced. Then the spacers 12 are so arranged that they engage in the tooth spaces of two spaced teeth of the test piece. The stationary feeler 14 is now adjusted to engage the flank of one tooth, and the movable feeler is allowed to contact the flank of the adjacent tooth. Variations in the spacing between successive teeth will then cause changes in the capacity of condenser 18, 19, and the measurement of the value of this capacity will indicate the distance between the teeth.

During the measurement the gear 1 is turned constantly and preferably at a uniform speed. Since the lever 3 can turn on its pivot 4 in the direction of the arrow B, while the carriage 6 is slidable in direction C and the carrier is turnable on the carriage as indicated at D, the carrier under the guidance of spacers 12 can be held in engagement with and can follow exactly the movement of the gear 1, maintaining the end of feeler 13 in engagement with the tooth flank as long as such movement continues.

After the measurement of the tooth spacing has been read off, the lever arm 5 is raised and moves the feelers and spacers out of contact with the gear. The carrier is then shifted back to approximately its original position and is again lowered so as to bring the spacers and feelers into engagement with the next adjacent teeth of the gear.

The manual movement of the carrier is limited to a relatively small arc of the gear. The universal mounting of the carrier and its counterbalancing make it possible for it to follow accurately the movement of the gear without subjecting the feelers to excessive forces, and thereby permit accurate measurements.

Fig. 3 shows the use of the mechanism of Fig. 1 for for the measurement of a gear mounted on a horizontal axis from the side, the carrier merely being turned on its pivot until its longitudinal axis is vertical. The same arrangement can also be used to measure gears mounted on vertical axes, axis 4 then being vertical also.

Fig. 3A shows the movable feeler 14' with spring 20' urging it towards fixed feeler 13. This arrangement is used for measuring the thickness of gear teeth. Tooth gap width can also be measured by the arrangement of Fig. 3 by placing feeler 13 closer to feeler 14 so that both will engage in the same tooth gap.

In order further to reduce measuring errors, it may be desirable to mount both the feelers in such a way that they have a limited movement with respect to the carrier for the spacers. Also, positioning means for the spacers will help to increase the accuracy of measurement. Such an arrangement is shown in Figs. 4 to 6.

Carrier 31, which is mounted on pivot 10 of carriage 6 in the same manner as carrier 11, carries the spacers 32 which are adjustably fixed, and which can engage the teeth of the gear. A frame 33 is hung by leaf springs 30 from the carrier so as to be movable tangentially with respect to the test piece through a small distance. Fixed feeler 34 and movable feeler 35 are mounted on the frame 33 in the same manner as the feelers of Fig. 1, the movable feeler carrying a condenser plate which cooperates with a fixed plate to give the measurement. A lever 37 pivoted in carrier 31 is connected by tension springs 36 to pins 36' on frame 33, so that turning of this lever in either direction tends to shift the frame in the corresponding direction.

A bolt 38 is slidably mounted in carrier 31 perpendicular to the direction of movement of frame 33. A compression spring 39 urges this bolt in such a direction that its conical head 40 normally engages between two adjustably mounted lugs 41, 42 fixed on frame 33 so as to prevent shifting of the frame in either direction. When pressure is applied to the finger-piece 43 of bolt 38 in the direction of arrow 46, contact 44 carried by the bolt and contact 45 mounted on the carrier are closed, thus closing the measuring circuit shown diagrammatically in Fig. 7. At the same time, conical head 40 is shifted out of engagement with lugs 41, 42 so that frame 33 is free to move and can be shifted by lever 37 to any desired position.

At least one of the spacers 32 is provided at its end with an axially slidable, outwardly spring-pressed shell 47 having a frusto-conical end surface engageable with the flanks of adjacent teeth so as to center the spacer between the two teeth.

The operation of this device is as follows:

The carrier is moved until the spacers engage the teeth of the gear. Lever 37 is then turned in the direction necessary to bring the feelers into contact with the gear teeth. However, the movement of the frame is prevented by bolt 38. Bolt 38 is now pushed inward and releases frame 33, which is shifted by springs 36 until the feelers engage the gear teeth. Simultaneously the contacts 44, 45 engage and close the measuring circuit so that the spacing of the teeth can be measured. The circuit may also include a lamp 48 to indicate that it is closed.

Since it is desirable that the spacers engage midway between the teeth, shell 47 is provided which serves as a positioner. This is especially helpful when measuring in a vertical plane where visibility is poor.

The arrangement of Fig. 4 has the advantage that the feelers 34, 35 are pressed against the tooth flanks only by the pressure of spring 36. In addition, it is not necessary for the user to cause the carrier with the spacers 32 to move exactly in the same relation to the movement of the work piece, especially since the shell 47 prevents peripheral shifting of the carrier with respect to the work piece. It is only necessary to bring the carrier radially against the work piece, utilizing the shell 47, whereupon the feelers come in contact with the tooth flanks to be measured and the electrical measurement can be carried out.

For the measurement of large gears with inclined or herringbone teeth, it is desirable to have the feelers make linear rather than point contact with the teeth. Instead of a sphere, there is provided an elongated section of a cylindrical body which engages the tooth flanks along a line. But this body must take up a position corresponding to the slope of the tooth, so as to engage the tooth flank along its whole length. For this purpose, feelers 34', 35' are provided at their outer ends with tooth engaging members shown in Fig. 6. These members 49 are turnable about the longitudinal axes of the feelers, but not axially movable with respect thereto. Each has an edge 50 shaped as a part of the surface of a cylinder having its axis transverse to the feeler axis. When brought into engagement with a tooth flank, member 49 will turn so as to engage the flank with the whole of edge 50, so that local unevenness or roughness of the flank will not affect the measurement.

While I have described herein some embodiments of my invention, I wish it to be understood that I do not intend to limit myself thereby except within the scope of the claims hereto or hereinafter appended.

I claim:

1. Apparatus for measuring gears and the like, comprising a lever mounted to turn about a first stationary axis, a member mounted on said lever for sliding movement with respect thereto in a line located in a plane perpendicular to said first axis, a carrier turnably mounted on said member about a second axis parallel to said first axis, a pair of spacing members fixed on said carrier for engagement with a gear or the like to hold the carrier at a fixed distance from the gear and to move it with the gear upon movement thereof, and a pair of feelers, means mounting said feelers on said carrier, said mounting means mounting at least one of said feelers to turn about a third axis parallel to said first two axes, resilient means operatively connecting the pivoted feeler to the carrier to hold such feeler in engagement with the gear, and means responsive to relative movement between the feelers for indicating the relative position of one with respect to the other.

2. Apparatus for measuring gears and the like, comprising a lever mounted to turn about a first stationary axis, a member mounted on said lever for sliding movement with respect thereto in a line located in a plane perpendicular to said first axis, a carrier turnably mounted on said member about a second axis parallel to said first axis, a pair of spacing members fixed on said carrier for engagement with a gear or the like to hold the carrier at a fixed distance from the gear and to move it with the gear upon movement thereof, and a pair of feelers, means mounting said feelers on said carrier, said mounting means mounting at least one of said feelers to turn about a third axis parallel to said first two axes fixed with respect to said carrier, resilient means operatively connecting the pivoted feeler to the carrier to hold such feeler in engagement with the gear, and means responsive to relative movement between the feelers for indicating the relative position of one with respect to the other.

3. Apparatus for measuring gears and the like, comprising a lever mounted to turn about a first stationary axis, a member mounted on said lever for sliding movement with respect thereto in a line located in a plane perpendicular to said first axis, a carrier turnably mounted on said member about a second axis parallel to said first axis, a pair of spacing members fixed on said carrier for engagement with a gear or the like to hold the carrier at a fixed distance from the gear and to move it with the gear upon movement thereof, a frame, means mounting the frame on the carrier for movement in a line at a fixed distance from the second axis, means limiting the movement of the frame along such line, a pair of feelers, means mounting said feelers on said frame, said mounting means mounting at least one of said feelers to turn about a third axis parallel to said first two axes, resilient means operatively connecting the pivoted feeler to the frame to hold such feeler in engagement with the gear, and means responsive to relative movement between the feelers for indicating the relative position of one with respect to the other.

4. In a device as claimed in claim 1 in which said lever has two arms extending in opposite directions from such first axis, said carrier being slidable on one of the arms and a counterweight mounted on the other arm.

5. In a device as claimed in claim 3, resilient means mounting said frame on said carrier.

6. In a device as claimed in claim 5, said resilient mounting means comprising leaf springs.

7. In a device as claimed in claim 5, a manually operable lever pivoted on said carrier and resilient means connecting said lever to said frame to impart a force to said frame when said lever is turned.

8. In a device as claimed in claim 7, a bolt slidable in said carrier in a direction perpendicular to said line, said frame having spaced lugs carried thereby, said bolt having a conical part engageable between said lugs, and spring means urging said bolt in a direction to engage such part with the lugs for normally holding the frame in a predetermined position, movement of said bolt against the action of the spring means permitting shifting of the carrier to permit the feelers to engage the gear.

9. In a device as claimed in claim 5, a bolt slidable in said carrier in a direction perpendicular to said line, said frame having spaced lugs carried thereby, said bolt having a conical part engageable between said lugs, and spring means urging said bolt in a direction to engage such part with the lugs for normally holding the frame in a predetermined position, movement of said bolt against the action of the spring means permitting shifting of the carrier to permit the feelers to engage the gear.

10. In a device as claimed in claim 1, at least one of said spacing members having a conical shell slidably mounted thereon adjacent its free end and resiliently pressed outwardly for centering the spacing member in the tooth gap.

11. In a device as claimed in claim 1, at least one of said feelers having a shoe at its outer end turnable about the longitudinal axis of the feeler.

References Cited in the file of this patent

UNITED STATES PATENTS

| | | |
|---|---|---|
| 1,579,108 | Harter | Mar. 30, 1926 |
| 1,961,925 | Drader | June 5, 1934 |

FOREIGN PATENTS

| | | |
|---|---|---|
| 605,041 | Germany | Nov. 2, 1934 |
| 664,311 | Germany | Aug. 30, 1938 |
| 480,868 | Great Britain | Mar. 2, 1938 |